United States Patent Office 3,265,773
Patented August 9, 1966

3,265,773
ALKOXYMETHYLENAMIDES OF O,O-DIALKYL-THIO- OR O,O-DIALKYL-DITHIOPHOSPHORYL-ACETIC ACIDS
Giuseppe Losco, Giorgio Rossi, and Giannantonio Michieli, all of Milan, Italy, assignors to Montecatini-Società Generale per l'Industria Mineraria e Chimica, Milan, Italy
No Drawing. Filed Feb. 28, 1961, Ser. No. 92,121
Claims priority, application Italy, Mar. 1, 1960, 3,555/60; Oct. 28, 1960, 18,772/60
21 Claims. (Cl. 260—943)

The present invention relates to a new class of phosphoric acid derivatives comprised in the general Formula 1

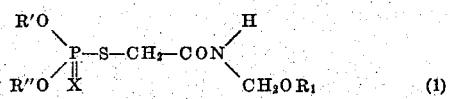

in which R' and R" are alkyl radicals having a low molecular weight, R' being different or equal to R", X is oxygen or sulfur, $R_1$ is an alkyl radical having a linear or branched saturated or unsaturated chain. The $R_1$ radical may contain a halogen, an oxyalkyl or a thioalkyl group.

The present invention also relates to processes for preparation of the above-mentioned phosphoric acid derivatives and their application as pesticides.

One object of the present invention is the provision of a new class of phosphoric acid esters of the general Formula 1, as above. These phosphoric acid derivatives are in the form of oils or crystalline low melting products, soluble in most of the organic solvents. The compounds in which X is sulfur, are scarcely water-soluble, while those in which X is oxygen are generally very soluble in water.

A further object of the present invention is a process for preparing compounds comprised in the general Formula 1. Said process is characterized by the fact that a metal dialkylthio or dialkyldithiophosphoric salt of the type:

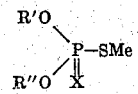

(wherein R', R" and X are the aforesaid groups and Me is sodium or potassium) is reacted, in the presence of water or of an inert solvent (e.g. acetone) at a temperature between 15 and 50° C., with an alkoxymethylenamide of monochloroacetic acid of the type:

$$Cl—CH_2—CONH—CH_2OR_1$$

(wherein $R_1$ has the above-mentioned meaning) until all the metal halide is precipitated according to the equation:

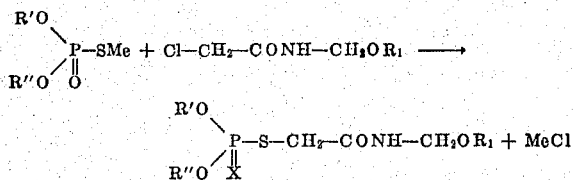

After removing the inorganic salt formed by filtration, the above reaction product is removed by adding to water or by evaporating the solvent under reduced pressure.

Another process for preparing compounds of the general Formula 1, wherein R', R" and $R_1$ have the above-mentioned meaning and X is sulfur, is carried out by reacting an N-methylolamide of an O,O-dialkyldithiophosphorylacetic acid with an alcohol, according to the equation:

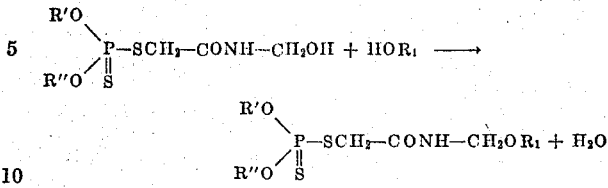

The above reaction is carried out in the presence of an acid, e.g. HCl, which acts as condensing agent. An excess of $R_1OH$ or a solvent or a mixture of inert solvents can be used as a diluent. The reaction temperature is kept 20 and 100° C. The reaction product is separated in a conventional manner, for instance by adding water (when the solvent used is water miscible) and/or preferably, by evaporating the solvent or the solvent mixtures, after having removed the acid catalyst.

Another object of the present invention is the provision of parasiticidal compositions containing one or more compounds comprised in the general Formula 1 either as single active component or mixed with other known substances having a parasiticidal activity and/or mixed with the adjuvants commonly used in the parasiticidal formulations.

All the compounds of the general Formula 1 have a remarkable parasiticidal activity either against domestic insects (e.g., *Musca domestica*) or against insects which are of interest to agriculture (e.g., aphids and red spider).

Further said compounds are adsorbed by the plant and transferred to all its organs. This property can therefore be exploited to control a large number of species of plant parasites.

The compounds of the instant invention can be used in various ways. Generally, it is advisable to dilute said compounds with solid or liquid carriers by adding wetting agents, or adhesives or dispersion agents or emulsifiers. Other substances having parasiticidal and/or fungicidal activity can be also associated with the above-mentioned compounds.

Among the compounds comprised in the general Formula 1 those in which R' and R" are preferably a methyl or ethyl group, and $R_1$ is a methyl, ethyl, propyl, isopropyl, propargyl, allyl, chloroethyl, methoxyalkyl or mercaptoalkyl radical show a particularly high parasiticidal activity. Among the above-mentioned compounds the following proved to be particularly active:

Methoxymethylenamide of O,O-dimethyldithiophosphorylacetic acid,
Methoxymethylenamide of O,O-diethyldithiophosphorylacetic acid,
Ethoxymethylenamide of O,O-dimethyldithiophosphorylacetic acid,
Propoxymethylenamide of O,O-dimethyldithiophosphorylacetic acid,
Propoxymethylenamide of O,O-diethyldithiophosphorylacetic acid,
Isopropoxymethylenamide of O,O-dimethyldithiophosphorylacetic acid,
Isopropoxymethylenamide of O,O-diethylthiophosphorylacetic acid,
Isopropoxymethylenamide of O,O-diethyldithiophosphorylacetic acid,
Propargyloxymethyenamide of O,O-dimethyldithiophosphorylacetic acid,
Propargyloxymethylenamide of O,O-diethyldithiophosphorylacetic acid,
Allyloxymethylenamide of O,O-dimethyldithiophosphorylacetic acid, Allyloxymethylenamide of O,O-diethyldithiophosphorylacetic acid,
Beta-methoxyethoxymethylenamide of O,O-dimethyldithiophosphorylacetic acid,
Beta-methoxyethoxymethylenamide of O,O-diethyldithiophosphorylacetic acid,
Methylmercaptoethoxymethylenamide of O,O-diethyldithiophosphorylacetic acid,
Beta-chloroethoxymethylenamide of O,O-dimethyldithiophosphorylacetic acid,
Methoxymethylenamide of the O-methyl, O-ethyl-dithiophosphorylacetic acid,
Ethoxymethylenamide of the O-methyl, O-ethyl-dithiophosphorylacetic acid,
Isopropoxymethylenamide of the O-methyl-O-ethyl-dithiophosphorylacetic acid,
N-propoxymethylenamide of the O-methyl, O-ethyl-dithiophosphorylacetic acid,
Propargyloxymethyleneamide of the O-methyl, O-ethyl-dithiophosphorylacetic acid,
Allyloxymethylenamide of the O-methyl, O-ethyl-dithiophosphorylacetic acid,
Beta-methoxymethylenamide of the O-methyl, o-ethyldithiophosphorylacetic acid,
Beta-methyl-mercaptoetoxymethylenamide of the O-methyl, O-ethyl-dithiophosphorylacetic acid, As illustratory of parasiticidal formualtions using the new class of phosphoric acid derivatives are the following:

A.
Parts by weight
Methoxymethylenamide of O,O-diethyldithiophosphorylacetic acid _____ 20
Methylcellosolve _____ 70
Surfactants consisting of the condensation product of ethylene oxide with alcohols and fatty acids _____ 10

B.
Isopropoxymethylenamide of O,O-diethyldithiophosphorylacetic acid _____ 20
Xylene _____ 70
Surfactants consisting of the condensation product of ethylene oxide and fatty alcohols and alkylphenols__ 10

C.
Methoxymethylenamide of O,O-diethyldithiophosphorylacetic acid _____ 10
Isopropoxymethylenamide of O,O - diethylthiophosphorylacetic acid _____ 10
Methanol _____ 70
Surfactants consisting of the condensation product of ethylene oxide with fatty alcohols and allkylphenols _____ 10

D.
Methoxymethylenamide of O,O-diethyldithiophosphorylacetic acid _____ 5
Dichloro diphenyl trichloroethane _____ 35
Diatomaceous earth _____ 53
Alkylarylsulphonates _____ 7

The following examples are given to illustrate the invention, but they are not limitative.

Example 1

50 g. aqueous solution of 33% O,O-dimethyldithiosodiumphosphate are added to 12 g. methoxymethylenamide of monochloroacetic acid. The mixture is heated at 40° C. for 10 minutes, while stirring and is then kept at room temperature for 20 hours. An oily product is separated, which crystallizes upon shaking with cold water. The product is filtered and washed with petroleum ether. The crystals (14 g.) are dissolved in 50 ml. benzene and 60 ml. petroleum ether are added to the solution. By evaporating the solvent, 11 g. of colorless crystals, melting point 40–42° C., of methoxymethylenamide of O,O-dimethyldithiophosphorylacetic acid having the structural formula:

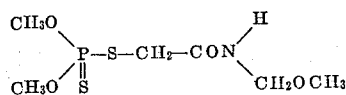

are obtained:

Example 2

40 g. N-methylolamide of O,O-dimethyldithiophosphorylacetic acid are treated with 50 ml. of anhydrous methanol followed by 3 ml. of a 10% HCl methanol solution. The vessel is sealed and the mixture is heated at 45° C. for 6 hours. The mixture is then maintained at room temperature for 60 hours after which it is diluted with 150 ml. water and neutralized, under stirring, with a saturated solution of sodium bicarbonate. 36 g. of a crystalline product are obtained, having a melting point 40–42° C., and being structurally identical to the product obtained according to the procedure described in Example 1.

*Analysis.*—N percent found: 5.35–5.38. N percent calculated: 5.40.

Example 3

31.2 g. of potassium salt of O,O-diethylphosphoric acid are added to 20.5 g. of methoxymethylenamide of the monochloroacetic acid dissolved in 60 ml. acetone. The mixture is heated under stirring at 40° C. for 10 minutes and is then maintained at room temperature for 20 hours. The potassium chloride (11 g.) obtained is separated by filtration and the obtained filtrate is concentrated under reduced pressure until the solvent is completely removed. The residue oil consists substantially of methoxymethylenamide of O,O-diethylthiophosphorylacetic acid of the formula:

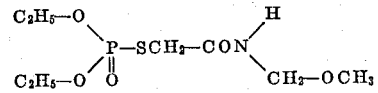

*Analysis.*—N percent found: 4.76. N percent calculated: 5.16.

Example 4

24.8 g. potassium salt of O,O-diethylthiophosphoric acid are treated with 31.3 g. isopropoxymethylenamide of the monochloroacetic acid in 60 ml. acetone. The mixture is heated for half an hour and then maintained at room temperature for 15 hours. Separating the products of the reaction in the manner described in Example 3, 44 g. product are obtained, which consists substantially of isopropoxymethylenamide of O,O-diethylthiophosphorylacetic acid of the formula:

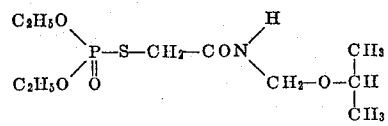

*Analysis.*—N percent found: 4.24. N percent calculated: 4.68.

Example 5

30 g. methylolamide of O,O-diethyldithiophosphorylacetic acid are treated with 40 ml. ethanol and 2 ml. 10% HCl methanol solution. The mixture is heated at 45° C. for 6 hours in a sealed vessel. The mixture is kept for 48 hours at room temperature and is then treated with 100 ml. H$_2$O. An oily liquid is separated which is diluted with methylenchloride and washed with H$_2$O. After having completely removed the solvent, 24 g. methoxymethylenamide of O,O-diethyldithiophosphorylacetic acid of the formula:

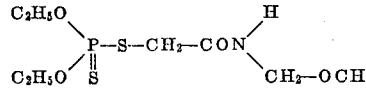

are obtained.

*Analysis.*—P percent found: 10.57. P percent calculated: 10.79.

Example 6

40 g. methylolamide of O,O-dimethyldithiophosphorylacetic acid are treated with 50 ml. anhydrous ethyl alcohol and 30 ml. of a 10% HCl ethanol solution. Separating the products of the reaction in the same manner as described in Example 5, about 40 g. ethoxymethylenamide of O,O-dimethyldithiophosphorylacetic acid of the formula:

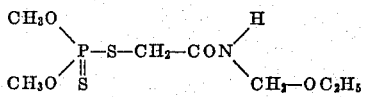

are obtained, as a solid mass (melting point 25° C.)

*Analysis.*—N percent found: 5.10. N percent calculated: 5.12.

Example 7

41 g. methylolamide of O,O-diethyldithiophosphorylacetic acid are treated with 9 g. isopropyl alcohol, 50 ml. ethyl acetate and 3 ml. of a 10% HCl isopropanol solution. The mixture is heated at 45° C. for 6 hours in a closed vessel and then maintained at room temperature for 15 hours. The reaction mass is neutralized with an aqueous saturated NaHCO₃ solution. 50 ml. CH₂Cl₂ are added and subsequently the reaction mass is twice washed with 100 ml. H₂O and finally the solvent is removed under reduced pressure. 40 g. colorless oil are thus obtained, which consists substantially of isopropoxymethylenamide of O,O-diethyldithiophosphorylacetic acid of the formula:

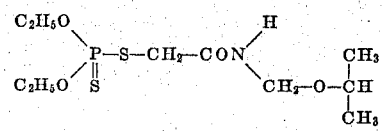

*Analysis.*—N percent found: 4.36. N percent calculated: 4.44.

Example 8

37 g. methylolamide of O,O-dimethyldithiophosphorylacetic acid are treated with 40 ml. ethylacetate, 9 g. isopropyl alcohol, 4 ml. of a 10% HCl isopropanol solution. Separating the products of the reaction in the manner described in Example 7, 37 g. of a colorless oil are obtained; said oil consists substantially of isopropoxymethylenamide of O,O-dimethyldithiophosphorylacetic acid of the formula:

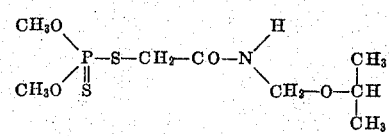

*Analysis.*—N percent found: 4.71. N percent calculated: 4.87.

Example 9

31 g. methylolamide of O,O-dimethyldithiophosphorylacetic acid are treated as described in Example 7, with 30 ml. ethylacetate, 7.5 g. n-propyl alcohol, 3 ml. of a 10% HCl propanol solution. The reaction mixture yields 31.5 g. of an oil consisting substantially of propoxymethylenamide of O,O-dimethyldithiophosphorylacetic acid of the formula:

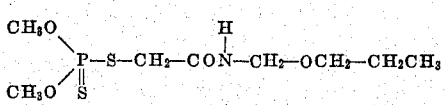

*Analysis.*—N percent found: 4.80. N percent calculated: 4.87.

Example 10

41 g. methylolamide of O,O-diethyldithiophosphoracetic acid are treated according to the procedure described in Example 7 with 50 ml. ethyl acetate, 9 g. n-propyl alcohol and 5 ml. of a 10% HCl propanol solution. 41.5 g. oil, consisting substantially of propoxymethylenamide of O,O-diethyldithiophosphoryl acetic acid of the formula:

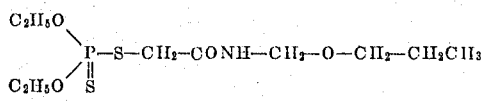

are obtained.

*Analysis.*—N percent found: 4.40. N percent calculated: 4.44.

Example 11

37 g. methylolamide of O,O-dimethyldithiophosphorylacetic acid are treated, according to the procedure described in Example 7, with 11 g. propargyl alcohol, 50 ml. ethyl acetate and 10 ml. of a HCl saturated benzene solution, 39 g. of an oil consisting substantially of propargyloxymethylenamide of O,O-dimethyldithiophosphorylacetic acid are thus obtained. The product has the formula:

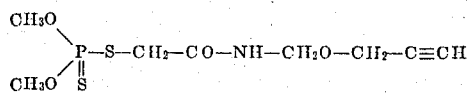

*Analysis.*—N percent found: 4.62 (calculated: 4.94). P percent found: 10.68 (calculated: 10.94).

Example 12

41 g. methylolamide of O,O-diethyldithiophosphorylacetic acid are treated as described in Example 7, with 11 g. propargyl alcohol, 40 ml. ethyl acetate and 10 ml. benzene saturated with HCl. The mixture yields 44 g. of an oil substantially consisting of propargyloxymethylenamide of O,O-diethydithiophosphorylacetic acid of the formula:

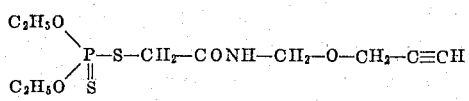

*Analysis.*—P percent found: 9.46. P percent calculated: 9.95.

Example 13

37 g. methylolamide of O,O-dimethyldithiophosphorylacetic acid are treated as described in Example 7, with 11.3 g. allyl alcohol, 50 ml. ethyl acetate and 10 ml. benzene saturated with HCl. The reaction mixture yields 38 g. of an oil consisting substantially of allyloxymethylenamide of O,O-dimethyldithiophosphorylacetic acid of the formula:

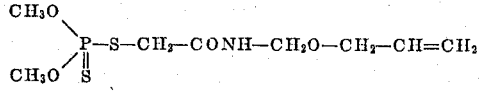

*Analysis.*—N percent found: 4.76. N percent calculated: 4.91.

Example 14

41 g. methylolamide of O,O-diethyldithiophosphorylacetic acid are treated according to Example 7, with 11.3 g. allyl alcohol, 50 ml. ethylacetate and 10 ml. benzene saturated with HCl. The reaction mixture yields 43 g. of an oil consisting substantially of allyloxymethylenamide of O,O-diethyldithiophosphorylacetic acid of the formula:

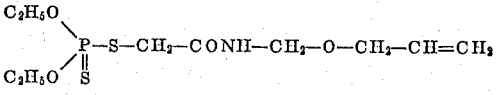

*Analysis.*—N percent found: 4.23. N percent calculated: 4.47.

Example 15

41 g. methylolamide of O,O-diethyldithiophosphorylacetic acid are treated as described in Example 7, with 14.8 g. 2-methoxyethanol, 50 ml. ethylacetate and 10 ml. benzene saturated with HCl. The mixture yields 45 g. of an oil which consists substantially of β-methoxyethoxymethylenamide of O,O-diethyldithiophosphorylacetic acid of the formula:

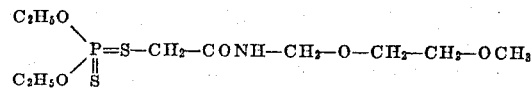

*Analysis.*—N percent found: 4.02. N percent calculated: 4.23.

Example 16

37 g. methylolamide of O,O-dimethyldithiophosphorylacetic acid treated as described in Example 7, with 14.8 g. 2-methoxyethanol, 50 ml. ethyl-acetate and 10 ml. benzene saturated with HCl, yield 42 g. of an oil, consisting substantially of methoxyethoxymethylenamide of O,O-dimethyldithiophosphorylacetic acid of the formula:

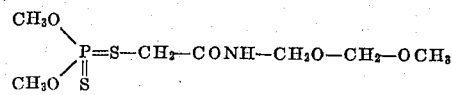

*Analysis.*—P percent found: 10.11. P percent calculated: 10.22.

Example 17

41 g. methylolamide of O,O-diethyldithiophosphorylacetic acid treated as described in Example 7, with 18 g. 2-methylmercaptoethanol, 50 ml. ethyl-acetate and 10 ml. benzene saturated with HCl, yield 51 g. of an oil consisting subtantially of methylmercaptoethoxymethylamide of O,O-diethyldithiophosphorylacetic acid of the formula:

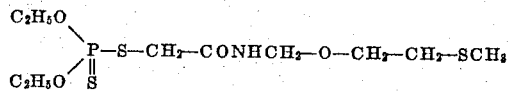

*Analysis.*—N percent found: 3.67. N percent calculated: 4.03.

Example 18

37 g. methylolamide of O,O-dimethyldithiophosphorylacetic acid treated as described in Example 7, with 15.7 g. 2-chloroethanol, 50 ml. ethyl-acetate and 10 ml. benzene saturated with HCl, yield 42.5 g. of an oil consisting substantially of β-chloroethoxymethylenamide of O,O-dimethyldithiophosphorylacetic acid of the formula:

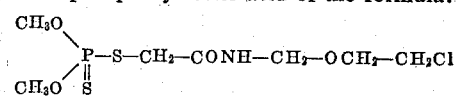

*Analysis.*—N percent found: 4.32. N percent calculated: 4.55.

Example 19

38.8 g. N-methylolamide of the O-methyl,O-ethyldithiophosphorylacetic acid are treated with 50 ml. anhydrous methanol and subsequently with 3 ml. of a 10% methanol solution. The vessel is sealed and the mixture is heated at 45° C. for 6 hours, then it is stored for 15 hours at room temperature. The mixture is evaporated under reduced pressure to a reduced volume and then the residue is treated with 50 ml. methylene chloride, washed with a saturated NaHCO₃ solution and finally with 70 ml. water. After having dried the mixture on anhydrous MgSO₄ and having evaporated the solvent, a residue consisting of 37 g. of a lightly straw-colored oil having $D_4^{20}=1.265$ and $n_D^{20}=1.5300$ is obtained. Said oil consists substantially of methoxymethylenamide of the O-methyl-O-ethyl-dithiophosphorylacetic acid having the formula:

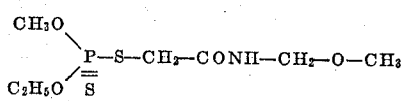

N calculated=5.12%; N found=4.85–4.86%.

Example 20

38.8 g. N-methylolamide of the O-methyl-O-ethyl-dithiophosphorylacetic acid are treated with 50 ml. absolute ethanol and then with 3 ml. of a 10% HCl ethanol solution. By operating as described in Example 19, a residue consisting of 37 g. of a lightly straw-colored oil having $D_4^{20}=1.230$ and $n_D^{20}=1.5245$ is obtained. Said oil consists essentially of the ethoxymethylenamide of the O-methyl-O-ethyl-dithiophosphorylacetic acid having the formula:

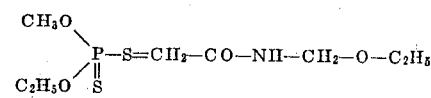

P calculated=10.78; P found=10.63–10.65%.

Example 21

38.8 g. N-methylolamide of the O-methyl,O-ethyldithiophosphorylacetic acid are suspended in the 40 ml. ethylacetate, 9 g. isopropylalcohol, and 3 ml. of a 10% HCl isopropanol solution. The mixture is heated, under continuous stirring, for 6 hours at 45° C. and is then stored at room temperature for 15 hours. The mixture is washed with 30 ml. of a saturated NaHCO₃ solution and thereafter with 50 ml. water. After having dried on anhydrous MgSO₄ and evaporated the solvent under reduced pressure, a residue consisting of 38 g. of a slightly straw-colored oil having $D_4^{20}=1.233$ and $n_D^{20}=1.5253$ is obtained. Said oil consists substantially of isopropoxymethylenamide of the O-methyl-O-ethyldithiophosphorylacetic acid having the formula:

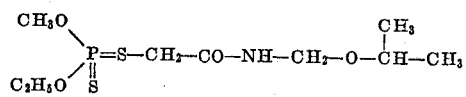

N calculated=4.64%; N found=4.68–4.69%.

Example 22

38.8 g. N-methylolamide of the O-methyl,O-ethyl-dithiophosphorylacetic acid are suspended in 50 ml. ethyl acetate; 9 g. propylic alcohol and then 5 ml. of a 10% propanol solution are added. By operating as described in Example 21, 37 g. of a lightly straw-colored oil having $D_4^{20}=1.233$ and $n_D^{20}=1.5273$ are obtained. Said oil consists of N-propoxymethylenamide of the O-methyl,O-ethyl-dithiophosphorylacetic acid having the formula:

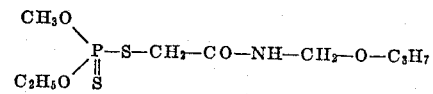

P calculated=10.28%; P found=10.63–10.64%.

Example 23

38.8 g. N-methylolamide of the O-methyl,O-ethyl-dithiophosphorylacetic acid are suspended in 50 ml. ethylacetate; 11 g. propargyl alcohol and 10 ml. benzene saturated in cold with gaseous HCl are then added. Said mixture is heated under frequent stirring for 6 hours at 45° C. and then stored for 15 hours at room temperature. The mixture is washed with a 120 ml. of a 4% NaHCO₃ solution, and subsequently with 50 ml. water. After having dried on MgSO₄ (anhydrous) and evaporated under reduced pressure, 38 g. of a red colored oil having $D_4^{20}=1.257$ and $n_D^{20}=1.5360$ are obtained. Said oil consists essentially of propargyloxymethylenamide of the O-methyl,O-ethyl-dithiophosphorylacetic acid having the formula:

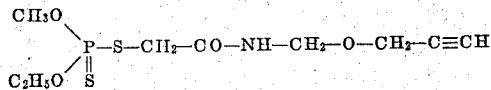

P calculated 10.41%; P found 10.46–10.64%.

*Example 24*

38.8 g. N-methylolamine of the O-methyl,O-ethyl-dithiophosphorylacetic acid are suspended into 50 ml. ethylacetate; 11.3 g. allyl alcohol and then 10 ml. benzene saturated in cold gaseous HCl are added. By operating as described in Example 21, 35.5 g. of a lightly straw-colored oil having $D_4^{20}=1.234$ and $n_D^{20}=1.5387$ are obtained. Said oil consists substantially of allyloxymethylenamide of the O-methyl,O-ethyl-dithiophosphorylacetic acid, having the formula:

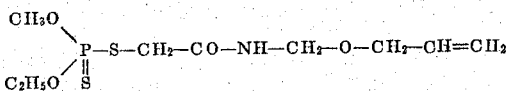

P calculated 10.34%; P found 10.41–10.47%.

*Example 25*

38.8 g. N-methylolamide of the O-methyl,O-ethyl-dithiophosphorylacetic acid are suspended into 50 ml. ethylacetate; 14.8 g. methoxyethyl alcohol and then 10 cc. benzene saturated in cold with gaseous HCl are added. By operating as described in Example 21, 39 g. of a straw-colored oil having $D_4^{20}=1.234$ and $n_D^{20}=1.5231$ are obtained. Said oil consists substantially of β-methoxyethoxy-methylenamide of the O-methyl,O-ethyldithiophosphorylacetic acid having the formula:

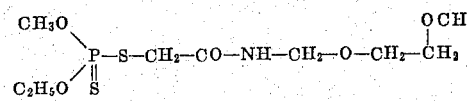

P calculated 9.76%; P found 9.95–9.99%.

*Example 26*

38.8 g. of N-methylolamide of the O-methyl,O-ethyl-dithiophosphorylacetic acid are suspended into 50 ml. of ethyl acetate; 18 g. of β-methyl-mercaptoethanol and then 10 ml. benzene saturated in cold with gaseous HCl are added to the suspension. By operating as described in Example 21, 36 g. of a yellow-colored oil having $D_4^{20}=1.281$ and $n_D^{20}=1.5529$ are obtained. Said oil consists substantially of β-methyl-mercaptoethoxymethylenamide of the O-methyl-O-ethyl-dithiophosphorylacetic acid having the formula:

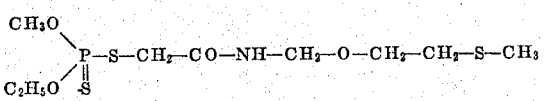

P calculated 9.29%; P found 9.09%.

RESULTS OF THE EFFECTIVENESS OF THE PARASITICIDAL ACTIVITY OBTAINED IN LABORATORY TESTS

To illustrate the insecticidal and parasiticidal activity of the aforesaid compounds obtained in the preceding examples the following examples are reported:

*Example 27.—Activity against* Musca domestica *for topical application*

The doses to obtain a 50% mortality of the insects, by using acetone solutions of the products obtained in Examples 1 to 18 in topical application tests, by means of a microsyringe on five-day old female flies, are the following:

| Substance obtained in Example No.: | LD/50 γfly |
|---|---|
| 1 | 0.105 |
| 3 | 0.450 |
| 4 | 1.200 |
| 5 | 1.500 |
| 6 | 0.260 |
| 7 | 0.660 |
| 8 | 0.380 |
| 9 | 0.263 |
| 10 | 0.630 |
| 11 | 0.305 |
| 12 | 0.460 |
| 13 | 0.390 |
| 14 | 0.650 |
| 15 | 0.800 |
| 16 | 0.378 |
| 17 | 0.840 |
| 18 | 0.330 |

*Example 28.—Activity against* Aphis fabae *(contact)*

The concentrations necessary to produce a 95% mortality by treating, under standardized conditions, with suitably formulated aqueous dispersions of the compounds to be tested, broad-bean plants infested by apterous parthenogenic females of *Aphis fabae*, which are bred under artificial light, are the following:

| Substance obtained in Example No.: | Conc., p.p.m. |
|---|---|
| 1 | 8.2 |
| 3 | 5.0 |
| 4 | 3.0 |
| 5 | 5.5 |
| 6 | 10.0 |
| 7 | 12.0 |
| 8 | 20.0 |
| 9 | 9.0 |
| 10 | 10.0 |
| 11 | 14.0 |
| 12 | 9.0 |
| 13 | 9.0 |
| 14 | 9.0 |
| 15 | 10.0 |
| 16 | 27.0 |
| 17 | 15.0 |
| 18 | 13.0 |

*Example 29.—Activity against* Tetranichus telarius

To obtain a 95% mortality on a mixed population of *Tetranichus telarius*, with mites of different growth stage, bred on bean plants under artificial light, but treating the plants under standardized conditions, with aqueous dispersions of the compounds considered, the following concentrations are necessary:

| Substance obtained in Example No.: | Conc., p.p.m. |
|---|---|
| 1 | 7.8 |
| 3 | 9.0 |
| 4 | 17.0 |
| 5 | 3.6 |
| 6 | 32.0 |
| 7 | 11.0 |
| 8 | 28.0 |
| 9 | 12.0 |
| 10 | 16.0 |
| 11 | 21.0 |
| 12 | 27.0 |
| 13 | 24.0 |
| 14 | 10.0 |
| 15 | 37.5 |
| 16 | 100.0 |
| 17 | 56.0 |
| 18 | 28.0 |

*Example 30.—Activity against* Aphis fabae, *by systemic rootway*

To obtain a 95% mortality within 6 days on apertous, parthenogenic females of *Aphis fabae*, which are bred under artificial light, on broad-bean plants in which the root apparatus is dipped into an aqueous suspension to be tested and suitably formulated product, the following doses are necessary:

| Substance obtained in Example No.: | Conc., p.p.m. |
|---|---|
| 1 | 0.67 |
| 3 | 0.17 |
| 4 | 0.45 |
| 5 | 0.32 |
| 6 | 0.80 |
| 7 | 0.64 |
| 8 | 1.60 |
| 9 | 1.30 |
| 10 | 0.22 |
| 12 | 0.80 |
| 13 | 0.80 |
| 14 | 0.86 |
| 15 | 0.60 |
| 17 | 0.52 |
| 18 | 0.90 |

*Example 31.—Activity against* Musca domestica *(topical application)*

By topical application, by means of a microsyringe of an acetone solution of the compounds to be tested, on five-day old female flies, the following average percentage mortalities listed in Table I, below, were obtained at the 20th hour; in said table are suggested also the doses necessary to obtain a 50% mortality of the insects.

TABLE I.—ACTIVITY AGAINST FLY (*MUSCA DOMESTICA*) BY TOPICAL APPLICATION

| Product | Dose γ/musca | Percent mortality at the 20th hour | LD$_{50}$ γ/fly |
|---|---|---|---|
| Methoxy-methylenamide of the O-methyl,O-ethyl-dithiophosphorylacetic acid. | 0.300<br>0.225<br>0.168<br>0.126 | 100<br>92<br>68<br>20 | 0.15 |
| Ethoxy-methylenamide of the O-methyl, O-ethyl-dithiophosphorylacetic acid. | 0.66<br>0.45<br>0.34<br>0.25 | 100<br>81<br>48<br>11 | 0.35 |
| Isopropoxy-methylenamide of the O-methyl,O-ethyl-dithiophosphorylacetic acid. | 0.667<br>0.500<br>0.375<br>0.281 | 100<br>93<br>58<br>19 | 0.35 |
| N-propoxy-methylenamide of the O-methyl,O-ethyl-dithiophosphorylacetic acid. | 0.800<br>0.600<br>0.450<br>0.337 | 100<br>90<br>64<br>31 | 0.4 |
| Propargyloxymethylenamide of the O-methyl,O-ethyl-dithiophosphorylacetic acid. | 0.600<br>0.450<br>0.340<br>0.250 | 100<br>89<br>53<br>17 | 0.328 |
| Allyloxymethylenamide of the O-methyl,O-ethyl-dithiophosphorylacetic acid. | 0.888<br>0.666<br>0.500<br>0.375<br>0.281 | 100<br>97<br>76<br>50<br>13 | 0.39 |
| β-Methoxyethoxy-methylenamide of the O-methyl, O-ethyl-dithiophosphorylacetic acid. | 1.000<br>0.800<br>0.600<br>0.450<br>0.337 | 100<br>98<br>88<br>54<br>24 | 0.43 |
| β-Methyl-mercaptoethoxy-methylenamide of the O-methyl, O-ethyl-dithiophosphorylacetic acid. | 1.2<br>0.8<br>0.6<br>0.45<br>0.337 | 100<br>90<br>76<br>49<br>27 | 4.15 |

*Example 32.—Activity against* Aphis fabae

By dipping a population of apterous, parthenogenic female adhips on broad bean plants, under standardized conditions into an aqueous dispersion of the suitably formulated compounds to be tested, the average percentage mortalities listed in Table II at the 24th hour were obtained. In said table also the doses necessary to obtain a 95% mortality of the insects are shown (a.s.=active substance).

TABLE II.—ACTIVITY ON APHIDS (*APHIS FABAE*) BY DIPPING

| Product | Dose, p.p.m. of a.s. | Percent mortality at the 24th | LD$_{95}$, p.p.m., h. of a.s. |
|---|---|---|---|
| Methoxymethylenamide of the O-methyl, O-ethyldithiophosphorylacetic acid. | 5.0<br>2.50<br>1.25<br>0.62<br>0.31<br>0.16 | 100<br>95<br>69<br>28<br>7<br>1 | 2.5 |
| Ethoxymethylamide of the O-methyl, O-ethyldithiophosphorylacetic acid. | 5.00<br>2.50<br>1.25<br>0.62 | 100<br>95<br>62<br>18 | 2.5 |
| Isopropoxymethylenamide of the O-methyl, O-ethyldithiophosphorylacetic acid. | 10.00<br>5.00<br>2.50<br>1.25 | 100<br>90<br>49<br>10 | 6.1 |
| N-propoxymethylenamide of the O-methyl, O-ethyldithiophosphorylacetic acid. | 10.00<br>5.00<br>2.50<br>1.25 | 100<br>98<br>72<br>24 | 4.2 |
| Propargyloxymethylenamide of the O-methyl, O-ethyldithiophosphorylacetic acid. | 10.00<br>5.00<br>2.50<br>1.25 | 100<br>99<br>65<br>15 | 5 |
| Allyloxymethylenamide of the O-methyl, O-ethyldithiophosphorylacetic acid. | 10.00<br>5.00<br>2.50<br>1.25<br>0.62 | 100<br>99<br>90<br>43<br>10 | 3.3 |
| β-methoxyethoxymethylenamide of the O-methyl, O-ethyldithiophosphorylacetic acid. | 20.00<br>10.00<br>5.00<br>2.50<br>1.25 | 100<br>99<br>93<br>65<br>30 | 6 |
| β-methylmercaptoethoxymethylenamide of the O-methyl, O-ethyldithiophosphorylacetic acid. | 125<br>62<br>31<br>16 | 100<br>92<br>55<br>20 | 72 |

*Example 33.—Activity against* Aphis fabae *by systemic rootway*

The hypogeum portion of young broad-bean plants infested by *Aphis fabae* is introduced into small pots of colored glass containing aqueous dispersions of the product to be tested. The pots are kept in a suitable place for the insects during a period of 7 days. The mortality of aphids living on the epygeum portion of the plant is inspected daily and the final inspection is made on the 7th day. In Table III are shown the average percentage mortalities and the doses necessary to obtain a 95% mortality.

TABLE III.—ACTIVITY AGAINST *APHIS FABAE* BY SYSTEMIC ROOTWAY

| Product | Dose p.p.m. of a.s. | Percent mortality on the 7th day | LD$_{95}$ p.p.m. of a.s. |
|---|---|---|---|
| Methoxymethylenamide of the O-methyl, O-ethyldithiophosphorylacetic acid. | 0.400<br>0.200<br>0.100<br>0.050<br>0.025 | 100<br>98<br>90<br>46<br>23 | 0.14 |
| Ethoxy-methylenamide of the O-methyl, O-ethyldithiophosphorylacetic acid. | 0.500<br>0.250<br>0.125<br>0.062<br>0.031 | 100<br>98<br>76<br>31<br>10 | 0.2 |
| Isopropoxy-methylenamide of the O-methyl, O-ethyldithiophosphorylacetic acid. | 0.62<br>0.31<br>0.16<br>0.08 | 100<br>81<br>39<br>0 | 0.48 |

TABLE III.—ACTIVITY AGAINST *APHIS FABAE* BY SYSTEMIC ROOTWAY—Continued

| Product | Dose p.p.m. of a.s. | Percent mortality on the 7th day | $LD_{95}$ p.p.m. of a.s. |
|---|---|---|---|
| N-propoxymethylenamide of the O-methyl, O-ethyldithiophosphorylacetic acid. | 0.500<br>0.250<br>0.125<br>0.062 | 100<br>70<br>25<br>22 | 0.46 |
| Propargyloxymethylenamide of the O-methyl, O-ethyldithiophosphorylacetic acid. | 1.25<br>0.26<br>0.31<br>0.16 | 100<br>98<br>89<br>43 | 0.43 |
| Allyloxymethylenamide of the O-methyl, O-ethyldithiophosphorylacetic acid. | 0.62<br>0.31<br>0.16<br>0.08 | 100<br>90<br>49<br>15 | 0.38 |
| β-methoxy-ethoxy-methylenamide of the O-methyl, O-ethyldithiophosphorylacetic acid. | 1.000<br>0.500<br>0.250<br>0.125<br>0.062 | 100<br>98<br>86<br>40<br>8 | 0.35 |
| β-methylmercaptoethoxymethylenamide of the O-methyl, O-ethyldithiophosphorylacetic acid. | 2.00<br>1.00<br>0.50<br>0.25 | 100<br>83<br>40<br>23 | 1.5 |

*Example 34.—Activity against* Tetranychus telarius

By dipping a mixed population of grown-up mites, on bean plants under standardized conditions, into an aqueous dispersion of the compounds to be tested, at the 24th hour the average mortalities listed in Table IV were obtained. Said table also shows the doses necessary to obtain a 95% mortality of the acarus.

TABLE IV.—ACTIVITY AGAINST ACARUS (*TETRANYCHUS TELARIUS*) BY DIPPING

| Product | Dose, p.p.m. of a.s. | Percent mortality at the 24th hour | $LD_{95}$, p.p.m. of a.s. |
|---|---|---|---|
| Methoxymethylenamide of the O-methyl, O-ethyldithiophosphorylacetic acid. | 2.50<br>1.25<br>0.62<br>0.31 | 100<br>84<br>42<br>4 | 1.7 |
| Ethoxy-methylenamide of the O-methyl, O-ethyldithiophosphorylacetic acid. | 5.0<br>2.5<br>1.25<br>0.62 | 100<br>93<br>23<br>7 | 2.7 |
| Isopropoxymethylenamide of the O-methyl, O-ethyldithiophosphorylacetic acid. | 10.00<br>5.00<br>2.50<br>1.25 | 100<br>92<br>65<br>13 | 6 |
| N-propoxymethylenamide of the O-methyl, O-ethyldithiophosphorylacetic acid. | 10.00<br>5.00<br>2.50<br>1.25 | 100<br>99<br>75<br>14 | 3.8 |
| Propargyloxymethylenamide of the O-methyl, O-ethyldithiophosphorylacetic acid. | 10.00<br>5.00<br>2.50<br>1.25 | 100<br>94<br>75<br>25 | 5 |
| Allyloxymethylenamide of the O-methyl, O-ethyldithiophosphorylacetic acid. | 20.00<br>10.00<br>5.00<br>2.50<br>1.25 | 100<br>98<br>88<br>50<br>8 | 7 |
| β-methoxy-ethoxy-methylenamide of the O-methyl, O-ethyldithiophosphorylacetic acid. | 20.00<br>10.00<br>5.00<br>2.50<br>1.25 | 100<br>99<br>85<br>47<br>14 | 7 |
| β-methylmercaproethoxy-methylenamide of the O-methyl, O-ethyldithiophosphorylacetic acid. | 500<br>250<br>125<br>62<br>31 | 100<br>98<br>87<br>54<br>17 | 180 |

We claim:
1. Phosphoric esters of the general formula

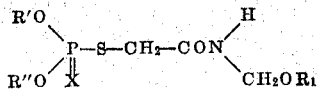

in which R′ and R″ are lower alkyl, X is taken from the group consisting of oxygen and sulfur, $R_1$ is taken from the group consisting of lower alkyl, allyl, propargyl, chloro lower alkyl, lower alkoxy lower alkyl and lower alkylmercapto lower alkyl.

2. Phosphoric esters of claim 1, in which R′ and R″ are methyl.

3. Phosphoric esters of claim 1, in which R′ and R″ are ethyl.

4. Phosphoric esters of claim 1, in which R′ is methyl and R″ is ethyl.

5. Phosphoric esters of claim 1, which $R_1$ is selected from the group consisting of an alkyl containing one to five carbon atoms, chloroloweralkyl, alkoxyloweralkyl and methylmercaptoloweralkyl group.

6. A compound of the formula:

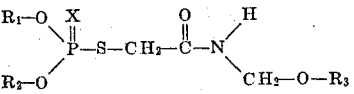

in which $R_1$ and $R_2$ are lower alkyl, $R_3$ is a member of the group consisting of lower alkyl and lower alkoxy-lower alkyl, and X is a member of the group consisting of oxygen and sulfur.

7. Methoxymethylenamide of O,O-dimethyldithiophosphorylacetic acid.

8. Methoxymethylenamide of O,O-diethylthiophosphorylacetic acid of the formula:

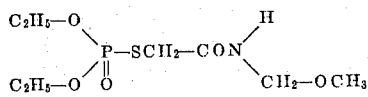

9. Methoxymethylenamide of O,O-diethyldithiophosphorylacetic acid.

10. Ethoxymethylenamide of O,O-dimethyldithiophosphorylacetic acid.

11. Propoxymethylenamide of O,O-dimethyldithiophosphorylacetic acid.

12. Propoxymethylenamide of O,O-diethyldithiophosphorylacetic acid.

13. Isopropoxymethylenamide of O,O-diethylthiophosphorylacetic acid of the formula:

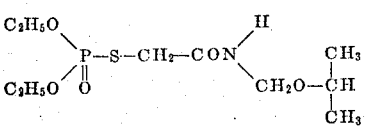

14. Isopropoxymethylenamide of O,O-diethyldithiophosphorylacetic acid.

15. Propargyloxymethylenamide of O,O-dimethyldithiophosphorylacetic acid.

16. Methoxymethylenamide of the O-methyl, O-ethyldithiophosphorylacetic acid.

17. Ethoxymethylenamide of the O-methyl O-ethyldithiophosphorylacetic acid.

18. n-Propoxymethylenamide of the O-methyl, O-ethyldithiophosphorylacetic acid.

19. Propargyloxymethylenamide of the O-methyl, O-ethyldithiophosphorylacetic acid.

20. Allyloxymethylenamide of the O-methyl, O-ethyldithiophosphorylacetic acid.

21. β-Methoxy-ethoxy-methylenamide of the O-methyl, O-ethyl-dithiophosphorylacetic acid.

No references cited.

CHARLES B. PARKER, *Primary Examiner.*

LESLIE H. GASTON, MORRIS LIEBMAN, IRVING MARCUS, *Examiners.*

FRANK M. SIKORA, JOSEPH P. BRUST,
*Assistant Examiners.*